US008255139B2

(12) United States Patent
Whitney et al.

(10) Patent No.: US 8,255,139 B2
(45) Date of Patent: Aug. 28, 2012

(54) METHOD TO INCLUDE FAST TORQUE ACTUATORS IN THE DRIVER PEDAL SCALING FOR CONVENTIONAL POWERTRAINS

(75) Inventors: Christopher E. Whitney, Highland, MI (US); Klaus Pochner, Russeisheim (DE); Todd R. Shupe, Milford, MI (US); Vivek Mehta, Bloomfield Hills, MI (US); Ning Jin, Novi, MI (US); Ronald W. Van Diepen, Ann Arbor, MI (US); Robert C. Simon, Jr., Brighton, MI (US); Etsuko Muraji Stewart, Laingsburg, MI (US); Jun Lu, Novi, MI (US); Enrico Tropschug, Hattersheim (DE); Jorg Bernards, Katzenelnbogen (DE); Helmut Oswald, Albig (DE)

(73) Assignee: GM Global Technology Operations LLC

( * ) Notice: Subject to any disclaimer, the term of this patent is extended or adjusted under 35 U.S.C. 154(b) by 773 days.

(21) Appl. No.: 12/432,240

(22) Filed: Apr. 29, 2009

(65) Prior Publication Data

US 2009/0276137 A1 Nov. 5, 2009

Related U.S. Application Data

(60) Provisional application No. 61/049,520, filed on May 1, 2008.

(51) Int. Cl.
*G06F 19/00* (2011.01)
*F02D 41/00* (2006.01)

(52) U.S. Cl. .................................................... 701/101

(58) Field of Classification Search .................. 701/101, 701/102, 110, 115, 53; 123/399, 350, 478, 123/480; 477/110, 111
See application file for complete search history.

(56) References Cited

U.S. PATENT DOCUMENTS

| | | | | | |
|---|---|---|---|---|---|
| 4,964,318 | A * | 10/1990 | Ganoung | ...................... | 477/110 |
| 5,954,779 | A * | 9/1999 | Dietzel | ........................... | 701/87 |
| 6,386,180 | B1 * | 5/2002 | Gerhardt et al. | .............. | 701/107 |
| 6,405,587 | B1 | 6/2002 | Livshiz | | |
| 7,463,970 | B2 | 12/2008 | Livshiz | | |
| 7,698,049 | B2 * | 4/2010 | Whitney et al. | ............... | 701/103 |

FOREIGN PATENT DOCUMENTS

JP 2004100528 A * 4/2004

* cited by examiner

*Primary Examiner* — Hieu T Vo

(57) ABSTRACT

An engine control system comprises a pedal torque determination module, a driver interpretation module, and an actuation module. The pedal torque determination module determines a zero pedal torque based on a desired engine torque at a zero accelerator pedal position and a minimum torque limit for an engine system. The driver interpretation module determines a driver pedal torque based on the zero pedal torque and an accelerator pedal position. The actuation module controls at least one of a throttle area, spark timing, and a fuel command based on the driver pedal torque.

20 Claims, 11 Drawing Sheets

METHOD TO INCLUDE FAST TORQUE ACTUATORS IN THE DRIVER PEDAL SCALING FOR CONVENTIONAL POWERTRAINS

CROSS-REFERENCE TO RELATED APPLICATIONS

This application claims the benefit of U.S. Provisional Application No. 61/049,520, filed on May 1, 2008. The disclosure of the above application is incorporated herein by reference.

FIELD

The present disclosure relates to engine torque control and more particularly to engine torque control via a driver pedal.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired predicted torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

An engine control system comprises a pedal torque determination module, a driver interpretation module, and an actuation module. The pedal torque determination module determines a zero pedal torque based on a desired engine torque at a zero accelerator pedal position and a minimum torque limit for an engine system. The driver interpretation module determines a driver pedal torque based on the zero pedal torque and an accelerator pedal position. The actuation module controls at least one of a throttle area, spark timing, and a fuel command based on the driver pedal torque.

In other features, a throttle valve is controlled based on the throttle area; a spark plug is controlled based on the spark timing; and a fuel injection system is controlled based on the fuel command.

In still other features, the minimum torque limit is based on a minimum air per cylinder and minimum spark timing for combustion while an air conditioning compressor is off.

In further features, the pedal torque determination module limits the zero pedal torque to the minimum torque limit.

In still further features, the driver interpretation module determines a driver predicted torque request and a driver immediate torque request based on the driver pedal torque. The actuation module adjusts the throttle area based on the driver predicted torque request and adjusts the spark timing and the fuel command based on the driver immediate torque request.

In other features, the driver interpretation module limits the driver predicted torque request to a minimum air torque determined for the engine system based on an optimal spark timing.

In still other features, the driver interpretation module limits the driver immediate torque request to the zero pedal torque when the driver pedal torque is less than the minimum air torque.

In further features, the driver interpretation module limits the driver immediate torque request to the zero pedal torque.

In still further features, the driver interpretation module increases the driver predicted torque request based on a reserve torque request generated by an engine speed control module.

In other features, the engine control system further comprises a torque cut-off module. The torque cut-off module decreases the driver immediate torque request at a predetermined rate to a fuel cut-off torque when the driver immediate torque request is equal to the zero pedal torque. The fuel cut-off torque is less than the minimum torque limit and the zero pedal torque.

An engine control method comprises: determining a zero pedal torque based on a desired engine torque at a zero accelerator pedal position and a minimum torque limit for an engine system; determining a driver pedal torque based on the zero pedal torque and an accelerator pedal position; and controlling at least one of a throttle area, spark timing, and a fuel command based on the driver pedal torque.

In other features, the engine control method further comprises controlling a throttle valve based on the throttle area; controlling a spark plug based on the spark timing; and controlling a fuel injection system based on the fuel command.

In still other features, the engine control method further comprises determining the minimum torque limit based on a minimum air per cylinder and minimum spark timing for combustion while an air conditioning compressor is off.

In further features, the engine control method further comprises limiting the zero pedal torque to the minimum torque limit.

In still further features, the engine control method further comprises determining a driver predicted torque request and a driver immediate torque request based on the driver pedal torque, adjusting the throttle area based on the driver predicted torque request, and adjusting the spark timing and the fuel command based on the driver immediate torque request.

In other features, the engine control method further comprises limiting the driver predicted torque request to a minimum air torque determined for the engine system based on an optimal spark timing.

In still other features, the engine control method further comprises limiting the driver immediate torque request to the zero pedal torque when the driver pedal torque is less than the minimum air torque.

In further features, the engine control method further comprises limiting the driver immediate torque request to the zero pedal torque.

In still further features, the engine control method further comprises increasing the driver predicted torque request based on a reserve torque request generated by an engine speed control module.

In other features, the engine control method further comprises decreasing the driver immediate torque request at a predetermined rate to a fuel cut-off torque when the driver immediate torque request is equal to the zero pedal torque. The fuel cut-off torque is less than the minimum torque limit and the zero pedal torque.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
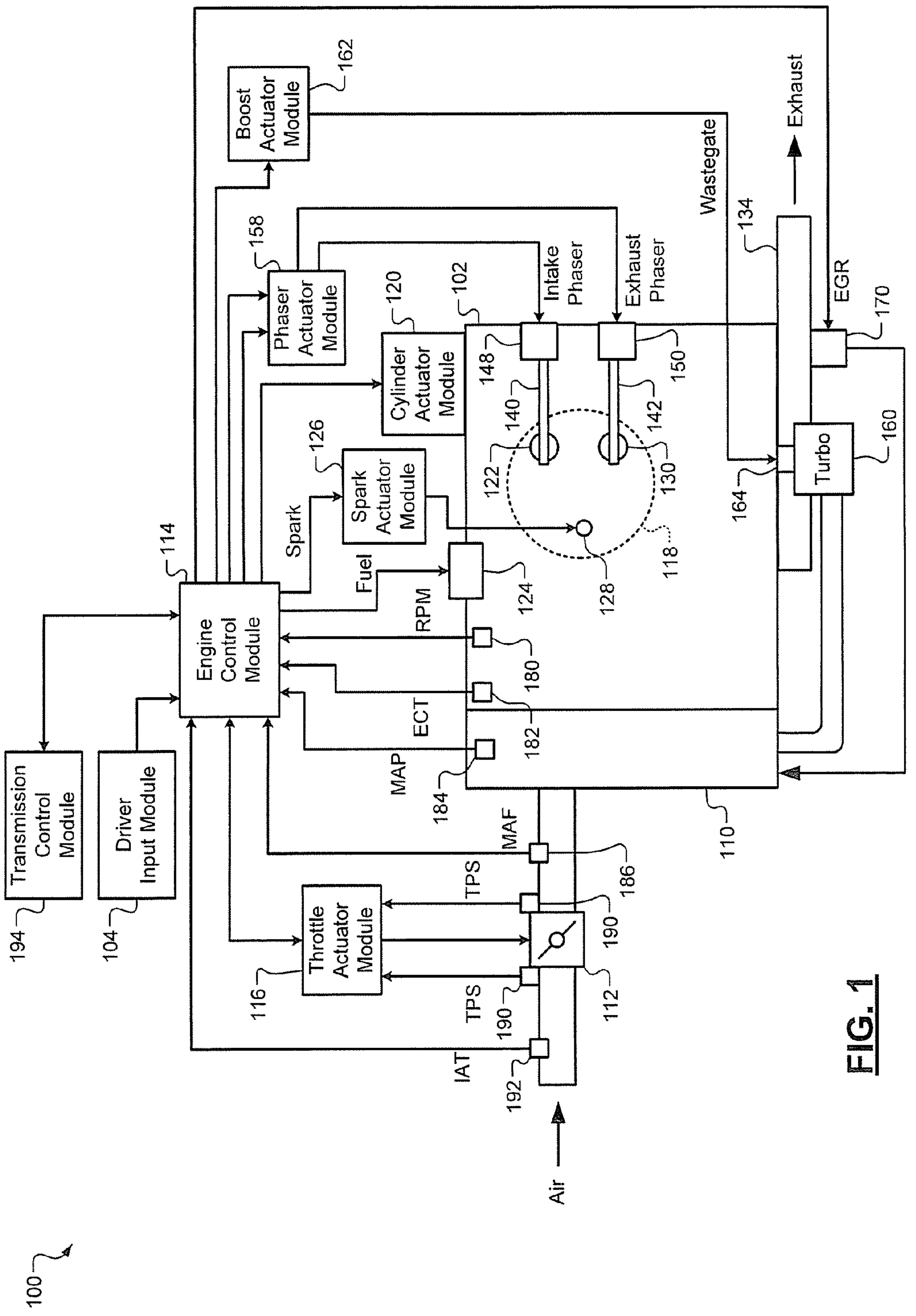
FIG. 1 is a functional block diagram of an exemplary implementation of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary implementation of an engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the cylinder 118 through an intake valve 122. The ECM 114 controls the amount of fuel injected by a fuel injection system 124 via a fuel command (i.e., Fuel). The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal, or a spark advance (i.e., Spark), from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control the exhaust valves of multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be taken from the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate heat that is generated when air is compressed and that may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. In various implementations, the MAF sensor 186 may be located in a housing with the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100. The ECM 114 may communicate with a transmission control module 194 to coordinate shifting gears in a transmission (not shown). For example, the ECM 114 may reduce torque during a gear shift.

Various control mechanisms (i.e., actuators) of the engine system 100 may vary respective engine parameters of the engine 102. For example, the throttle actuator module 116 may change the blade position (i.e., actuator position), and therefore the opening area, of the throttle valve 112. Similarly, the spark actuator module 126 may control an actuator position that corresponds to an amount of a spark advance. Other actuators include the boost actuator module 162, the EGR valve 170, the phaser actuator module 158, the fuel injection system 124, and the cylinder actuator module 120. Actuator positions with respect to these actuators may correspond to boost pressure, EGR valve opening, intake and exhaust cam phaser angles, air/fuel ratio, and number of cylinders activated, respectively.

Figure 2:
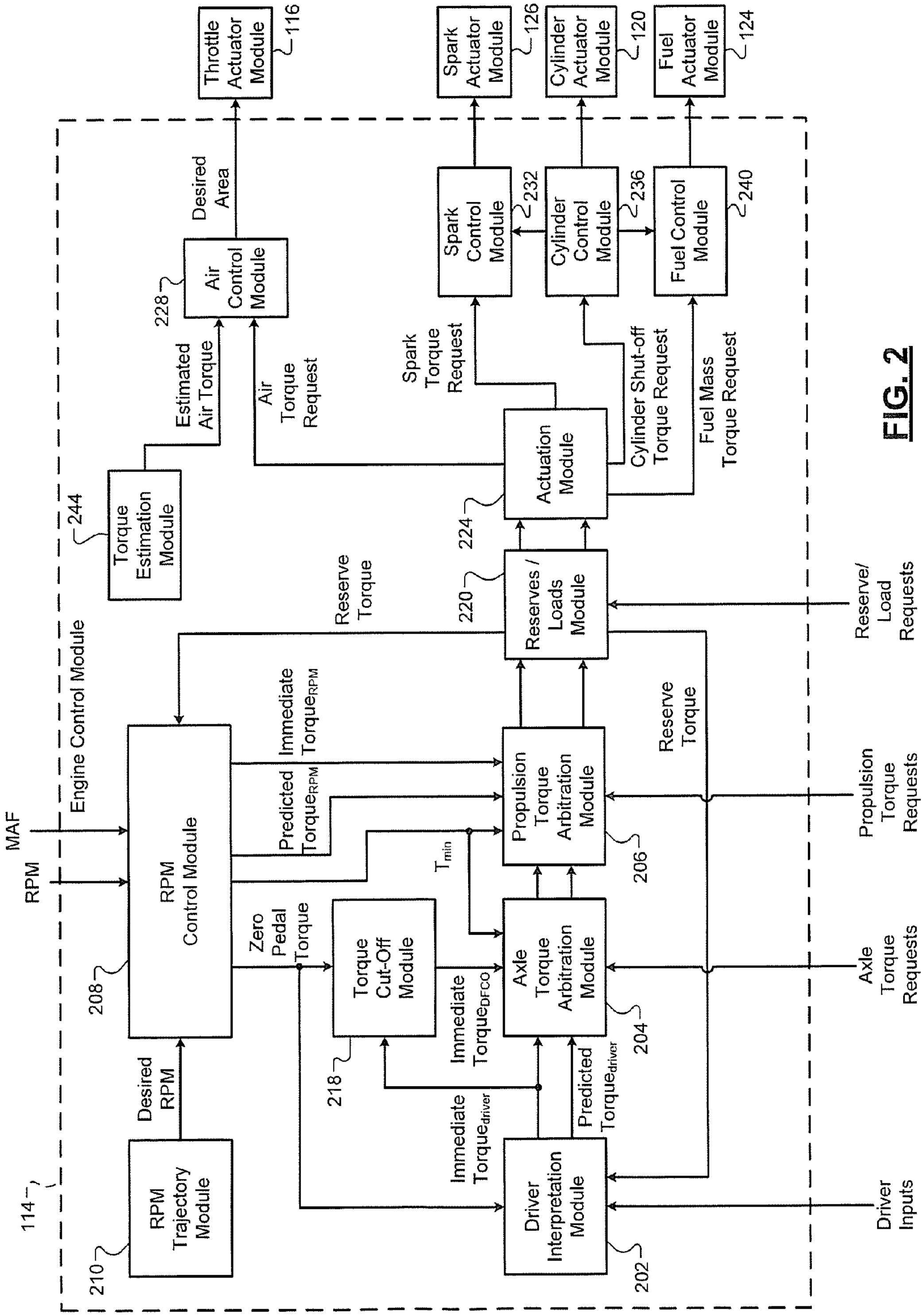
FIG. 2 is a functional block diagram of an exemplary implementation of an engine control module according to the principles of the present disclosure.

Referring now to FIG. 2, a functional block diagram of the ECM 114 is presented. The ECM 114 includes a driver interpretation module 202. The driver interpretation module 202 receives driver inputs from the driver input module 104. For example, the driver inputs may include an accelerator pedal position and/or shift requests input by the driver. Another driver input may be based on cruise control, which may be an adaptive cruise control system that varies vehicle speed to maintain a predetermined following distance. The driver interpretation module 202 determines a driver predicted torque request (predicted $\text{torque}_{driver}$) and a driver immediate torque request (immediate $\text{torque}_{driver}$) based on the driver inputs.

The ECM 114 includes an axle torque arbitration module 204. The axle torque arbitration module 204 arbitrates between the torque requests from the driver interpretation module 202 and other axle torque requests. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine shutoff requests, such as may be generated when a critical fault is detected.

The axle torque arbitration module 204 outputs a predicted torque and an immediate torque based on the results of arbitrating between the received torque requests. The predicted torque is the amount of torque that the ECM 114 prepares the engine 102 to generate, and may often be based on the driver predicted torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, in a gas engine, spark advance may be adjusted quickly, while air flow and cam phaser position may be slower to respond because of mechanical lag time. Further, changes in air flow are subject to air transport delays in the intake manifold 110. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 112 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The propulsion torque arbitration module 206 receives the predicted torque and the immediate torque. The predicted and immediate torques received by the propulsion torque arbitration module 206 are converted from an axle torque domain (torque at the wheels) into a propulsion torque domain (torque at the crankshaft). The propulsion torque arbitration module 206 arbitrates between propulsion torque requests, including the converted predicted and immediate torques. The propulsion torque arbitration module 206 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module 206 may still receive these shutoff requests so that, for example, appropriate data can be fed back to other torque requesters. For example, all other torque requesters may be informed that they have lost arbitration. Propulsion torque requests may also include torque requests from a speed control module, which may control engine speed during idle and coastdown, such as when the driver removes their foot from the driver pedal.

Propulsion torque requests may also include a clutch fuel cutoff, which may reduce engine torque when the driver depresses the clutch pedal in a manual transmission vehicle. A catalyst light-off or cold start emissions process may vary spark advance for an engine. A corresponding propulsion torque request may be made to increase the MAF and balance out the change in spark advance. In addition, the air-fuel ratio of the engine and/or the mass air flow of the engine may be varied, such as by diagnostic intrusive equivalence ratio testing and/or new engine purging. Corresponding propulsion torque requests may be made to offset these changes.

Propulsion torque requests may also include a shutoff request, which may be initiated by detection of a critical fault. For example, critical faults may include vehicle theft detection, stuck starter motor detection, electronic throttle control problems, and unexpected torque increases. In various implementations, various requests, such as shutoff requests, may not be arbitrated. For example, they may always win arbitration or may override arbitration altogether. The propulsion torque arbitration module 206 may still receive these requests so that, for example, appropriate data can be fed back to other torque requesters.

The propulsion torque arbitration module 206 arbitrates between torque requests from the axle torque arbitration module 204, an RPM control module 208, and other propulsion torque requests. Other propulsion torque requests may include, for example, torque reductions for engine over-speed protection and torque increases for stall prevention.

The RPM control module 208 outputs a RPM predicted torque request (predicted torque$_{RPM}$) and an RPM immediate torque request (immediate torque$_{RPM}$) to the propulsion torque arbitration module 206. The propulsion torque arbitration module 206 may simply select the torque requests from the RPM control module 208 as winning the arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque requested by the axle torque arbitration module 204 is less than a calibratable torque value.

A reserves/loads module 220 receives the arbitrated predicted and immediate torque requests from the propulsion torque arbitration module 206. Various engine operating conditions may affect the engine torque output. In response to these conditions, the reserves/loads module 220 may create a torque reserve (or reserve torque) by increasing the predicted torque request.

For example only, a catalyst light-off process or a cold start emissions reduction process may directly vary spark advance for an engine. The reserves/loads module 220 may therefore increase the predicted torque request to counteract the effect of that spark advance on the engine torque output. In another example, the air/fuel ratio of the engine and/or the mass air flow may be directly varied, such as by diagnostic intrusive equivalence ratio testing and/or new engine purging. Corresponding predicted torque requests may be made to offset changes in the engine torque output during these processes.

The reserves/loads module 220 may also create a reserve in anticipation of a future load, such as the engagement of the air conditioning compressor clutch or power steering pump operation. The reserve for air conditioning (A/C) clutch engagement may be created when the driver first requests air conditioning. Then, when the A/C clutch engages, the reserves/loads module 220 may add the expected load of the A/C clutch to the immediate torque request. Further discussion of the reserve torque can be found in commonly assigned patent application Ser. No. 11/972,090, filed Jan. 10, 2008, and entitled "Reserve Torque Management for Engine Speed Control," the disclosure of which is incorporated herein by reference in its entirety.

An actuation module 224 receives the predicted and immediate torque requests from the reserves/loads module 220. The actuation module 224 determines how the predicted and immediate torque requests will be achieved. The actuation module 224 may be engine type specific, with different control schemes for gas engines versus diesel engines. In various implementations, the actuation module 224 may define the boundary between modules prior to the actuation module 224, which are engine independent, and modules that are engine dependent.

For example, in a gas engine, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 224 may generate an air torque request based on the predicted torque request. The air torque request may be equal to the predicted torque request, causing air flow to be set so that the predicted torque request can be achieved by changes to other actuators.

An air control module 228 may determine desired actuator values for slow actuators based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

In gas systems, the actuation module 224 may also generate a spark torque request, a cylinder shut-off torque request, and a fuel mass torque request. The spark torque request may be used by a spark control module 232 to determine how much to retard the spark (which reduces the engine torque output) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly. The cylinder control module 236 may also instruct a fuel control module 240 to stop providing fuel for deactivated cylinders and may instruct the spark control module 232 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 240 to vary the amount of fuel provided to each cylinder. For example only, the fuel control module 240 may determine a fuel mass that, when combined with the current amount of air per cylinder, yields stoichiometric combustion. The fuel control module 240 may instruct the fuel actuator module 124 to inject this fuel mass for each activated cylinder. During normal engine operation, the fuel control module 240 may attempt to maintain a stoichiometric air/fuel ratio.

The fuel control module 240 may increase the fuel mass above the stoichiometric value to increase engine torque output and may decrease the fuel mass to decrease engine torque output. In various implementations, the fuel control module 240 may receive a desired air/fuel ratio that differs from stoichiometry. The fuel control module 240 may then determine a fuel mass for each cylinder that achieves the desired air/fuel ratio. In diesel systems, fuel mass may be the primary actuator for controlling engine torque output.

According to the present disclosure, the actuation module 224 may generate the specific torque requests so the throttle valve 112 may be closed just enough so that the desired immediate torque can be achieved by retarding the spark as far as possible. This provides for rapid resumption of the previous torque, as the spark can be quickly returned to its calibrated timing, which generates maximum torque. In this way, the use of relatively slowly-responding throttle valve corrections is minimized by maximizing the use of quickly-responding spark retard.

The approach the actuation module 224 takes in achieving the immediate torque request may be determined by a mode setting. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the immediate torque request and attempt to achieve the predicted torque request. The actuation module 224 may therefore set the spark torque request, the cylinder shut-off torque request, and the fuel mass torque request to the predicted torque request, which maximizes torque output for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 may attempt to achieve the immediate torque request by adjusting only spark advance. The actuation module 224 may therefore output the predicted torque request as the air torque request and the immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 224 may output the predicted torque request as the air torque request and the immediate torque request as the spark torque request. In addition, the actuation module 224 may generate a cylinder shut-off torque request that is low enough to enable the spark control module 232 to achieve the immediate torque request. In other words, the actuation module 224 may decrease the cylinder shut-off torque request (thereby deactivating cylinders) when reducing spark advance alone is unable to achieve the immediate torque request.

In the auto actuation mode, the actuation module 224 may decrease the air torque request based on the immediate torque request. For example, the air torque request may be reduced only so far as is necessary to allow the spark control module 232 to achieve the immediate torque request by adjusting spark advance. Therefore, in auto actuation mode, the immediate torque request is achieved while allowing the engine 102 to return to the predicted torque request as quickly as possible. In other words, the use of relatively slowly-responding throttle valve corrections is minimized by reducing the quickly-responding spark advance as much as possible.

A torque estimation module 244 may estimate torque output of the engine 102. This estimated torque may be used by the air control module 228 to perform closed-loop control of engine air flow parameters, such as throttle area, MAP, and phaser positions. For example only, a torque relationship such as $$T=f(APC,S,I,E,AF,OT,\#) \qquad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

While the actual spark advance may be used to estimate torque, when a calibrated spark advance value is used to estimate torque, the estimated torque may be called an estimated air torque. The estimated air torque is an estimate of how much torque the engine could generate at the current air flow if spark retard was removed (i.e., spark advance was set to the calibrated spark advance value).

The air control module 228 may generate a desired manifold absolute pressure (MAP) signal, which is output to a boost scheduling module 248. The boost scheduling module 248 uses the desired MAP signal to control the boost actuator module 164. The boost actuator module 164 then controls one or more turbochargers and/or superchargers.

The air control module 228 may generate a desired area signal, which is output to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may also generate a desired air per cylinder (APC) signal, which is output to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#). \qquad (2)$$

This relationship may be embodied as an equation and/or as a lookup table. The air/fuel ratio (AF) may be the actual ratio, as indicated by the fuel control module 240.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

Referring back to the RPM control module 208, the RPM control module 208 receives a desired RPM from an RPM trajectory module 210 and the RPM signal from the RPM sensor 180. The RPM trajectory module 210 determines the desired RPM for RPM mode. For example only, the RPM trajectory module 210 may output a linearly decreasing RPM until the RPM reaches an idle RPM. The RPM trajectory module 210 may then continue outputting the idle RPM. In various implementations, the RPM trajectory module 210 may function as described in commonly assigned U.S. Pat. No. 6,405,587, issued on Jun. 18, 2002 and entitled "System and Method of Controlling the Coastdown of a Vehicle," the disclosure of which is expressly incorporated herein by reference in its entirety.

The RPM control module 208 determines a zero pedal torque based on a desired engine torque. In other implementations, another module, such as a zero pedal torque determination module (not shown) may be implemented independently of the RPM control module 208. The zero pedal torque is the torque value when the driver is off of the accelerator pedal (i.e., when the accelerator pedal is in a zero accelerator pedal position).

When the ECM 114 is in RPM mode, the RPM control module 208 determines the desired engine torque based on the desired RPM and the actual RPM. Further discussion of determining the desired engine torque can be found in commonly assigned U.S. Pat. No. 7,463,970, issued on Oct. 8, 2008, and entitled "Torque Based Engine Speed Control," the disclosure of which is incorporated herein by reference in its entirety.

The RPM control module 208 applies a lower limit to the zero pedal torque. The lower limit is set to one of various minimum torque values that the actuators may achieve. For example only, a minimum air torque is the torque value at the minimum air per cylinder and the optimum spark advance that can maintain proper air/fuel combustion.

For example only, a minimum spark torque is the torque value at the minimum air per cylinder and the minimum spark advance that can maintain proper combustion. For example only, a minimum fuel cut off torque is the torque value when the cylinders are disabled through fuel injection disablement to the cylinders (e.g., deceleration fuel cut off or DFCO). For example only, the minimum torques may be predetermined with air conditioning actuators turned off.

The zero pedal torque is defaulted to the torque value at the minimum air per cylinder and the minimum spark advance with the air conditioning actuators off. Offsets (i.e., deltas) may be ramped in or out of the zero pedal torque to slowly change the zero pedal torque and thus provide the driver with a better feel. Ramping the offsets prevents changes in the zero pedal torque (and therefore the engine torque output) that may otherwise occur when the air conditioning clutch changes states. Large changes in the zero pedal torque may in turn cause a clunk or a bump. The zero pedal torque is provided, as limited, to the driver interpretation module 202.

The RPM control module 208 determines a minimum torque (i.e., $T_{min}$) required to maintain the desired RPM and prevent engine stalls from, for example, a look-up table. For example only, the minimum torque may be determined as the sum of the zero pedal torque and the reserve torque. The RPM control module outputs the minimum torque to the axle torque arbitration module 204 and the propulsion torque arbitration module 206 for limitation of the predicted torque requests.

The ECM 114 further includes a torque cut-off module 218 that receives the immediate torque from the driver interpretation module 202 and the zero pedal torque from the RPM control module 208. The torque-cut off module 218 may be located as shown or at other locations, such as within the driver interpretation module 202 or the actuation module 224 (not shown), for example. The zero pedal torque may be converted from a propulsion torque to an axle torque by the driver interpretation module 202, the RPM control module 208, or the torque cut-off module 218 (not shown).

The torque cut-off module 218 determines whether the ECM 114 is in a DFCO mode based on the driver immediate torque request and the zero pedal torque. For example only, when the driver immediate torque request is equal to the zero pedal torque (in the axle torque domain), the DFCO mode may be enabled. In this manner, the driver immediate torque request is used as an enabling criteria for the DFCO mode.

When the DFCO mode is enabled, the torque cut-off module 218 determines an immediate torque that disables the cylinders (immediate torque$_{DFCO}$). This torque, the torque that disables the cylinders, will be referred to as a DFCO torque. The torque cut-off module 218 may ramp from the driver immediate torque request down to the torque cut-off immediate torque when the DFCO mode is enabled. When the DFCO mode is not enabled, the torque cut-off module 218 ramps the immediate torque to the driver immediate torque request from the driver interpretation module 202. The torque cut-off module 218 outputs the DFCO torque to the axle torque arbitration module 204.

Figure 3:
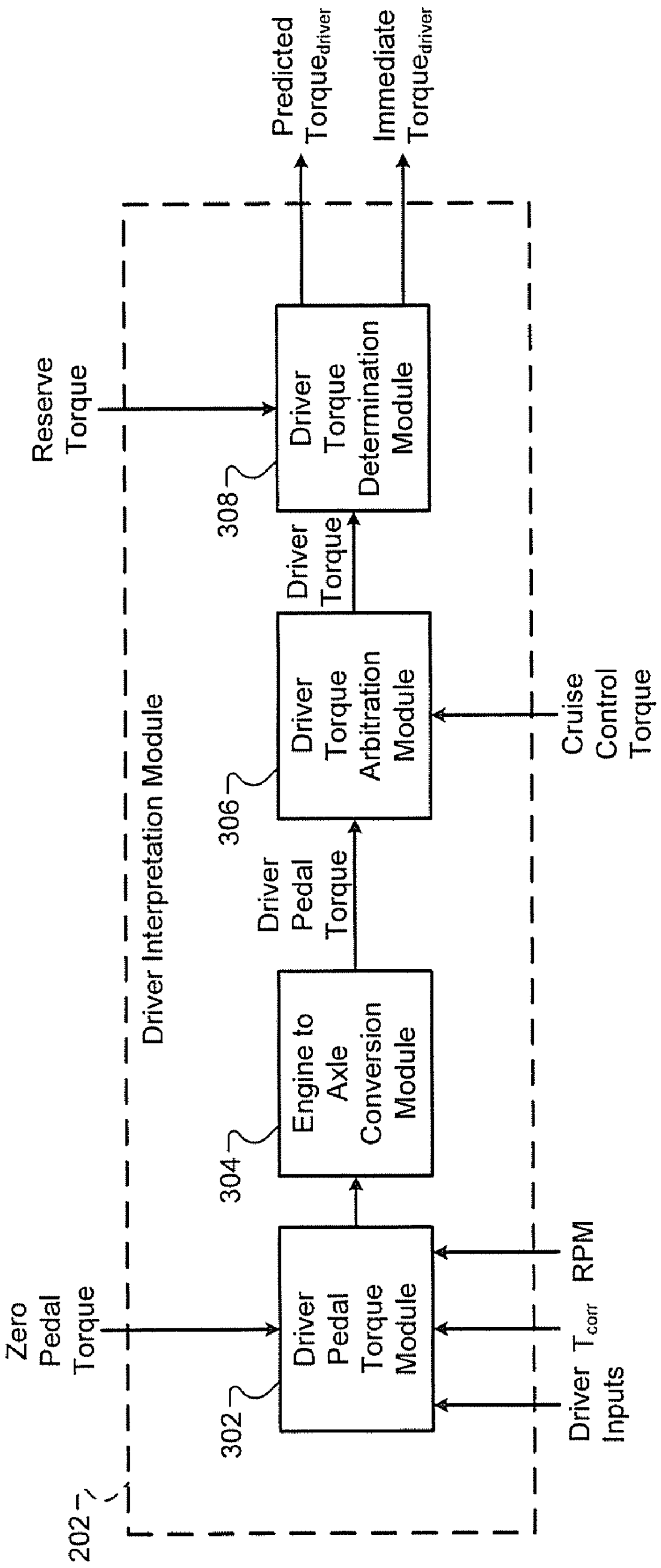
FIG. 3 is a functional block diagram of an exemplary implementation of a driver interpretation module according to the principles of the present disclosure.

Referring now to FIG. 3, a functional block diagram of an exemplary implementation of the driver interpretation module 202 is presented. The driver interpretation module 202 includes a driver pedal torque module 302, an engine to axle conversion module 304, a driver torque arbitration module 306, and a driver torque determination module 308. The driver pedal torque module 302 receives the driver inputs, the zero pedal torque, and a torque correction factor (i.e., $T_{corr}$) determined by the RPM control module 208 for the zero pedal torque, and the actual RPM. In another implementation, the torque correction factor is determined for the vehicle speed.

The driver pedal torque module 302 determines a driver pedal torque (i.e., a torque value that is requested by the driver via the driver inputs). The driver pedal torque module 302 determines the driver pedal torque based on the driver inputs, the zero pedal torque, the torque correction factor, and the actual RPM. For example only, the driver pedal torque $T_{driver}$ may be determined according to the following equation:

$$T_{driver}=T_{zero}+T_{corr}+PP*(T_{max}-T_{zero}), \quad (1)$$

where $T_{zero}$ is the zero pedal torque, PP is the pedal position scalar, and $T_{max}$ is a maximum torque determined based on the actual RPM from, for example, a look-up table. For example only, the pedal position scalar may be determined from a look-up table as a function of the accelerator pedal position, current gear selection, and/or other suitable parameters. In one implementation, the pedal position scalar may be zero when the accelerator pedal is in a steady-state, resting position (e.g., 0% actuation) and may be one (or more) when the accelerator pedal is fully depressed (e.g., 100% actuation), but may also be one when the accelerator pedal is partially depressed (e.g., 30% actuation).

The engine to axle conversion module 304 receives the driver pedal torque and converts the driver pedal torque from a propulsion torque request to an axle torque request. The driver torque arbitration module 306 receives the driver pedal torque and other driver torque requests. The driver torque arbitration module arbitrates between the driver pedal torque and the other driver torque requests to determine a driver torque request (i.e., a driver torque). For example only, the other driver torque requests may include, but are not limited to, a cruise control torque.

The driver torque determination module 308 receives the driver torque from the driver torque arbitration module 306 and the reserve torque from the RPM control module 208. The driver torque determination module 308 determines the driver predicted torque request and a driver immediate torque request based on the driver torque and the reserve torque. The driver torque determination module 308 adjusts the driver predicted torque request to achieve the driver torque when the driver torque is greater than or equal to the minimum air torque. The driver torque determination module 308 sets the driver predicted torque request to the minimum air torque when the driver torque is less than the minimum air torque. The driver torque determination module 308 adjusts the driver immediate torque request to achieve the driver torque when the driver torque is less than the minimum air torque.

To provide the driver a better feel, the driver torque determination module 308 selectively rate limits the respective requests. The rate limit is predetermined based on an estimate of the feel the driver desires at the driver torque. The rate limit changes based on the driver torque.

For example only, the rate limit may be decreased when the driver torque is in a lash zone, or has a torque value between an upper lash zone torque (e.g., 10 Nm) and a lower lash zone torque (e.g., −10 Nm). In the lash zone, changes in the driver torque may more easily result in the driver experiencing a poor feel. To provide better transitions from the RPM mode, the driver torque determination module 308 determines the driver predicted torque request by adding the reserve torque to the driver torque.

Figure 4:
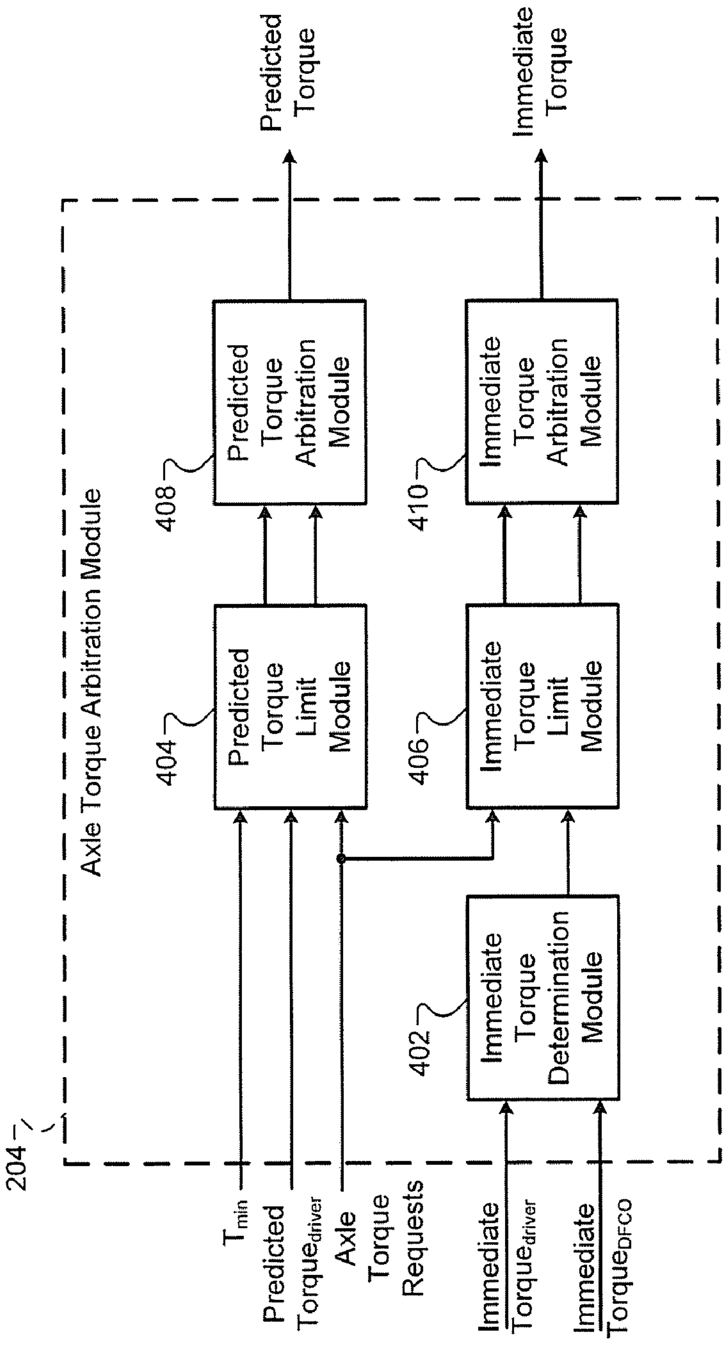
FIG. 4 is functional block diagram of an exemplary implementation of an axle torque arbitration module according to the principles of the present disclosure.

Referring now to FIG. 4, a functional block diagram of an exemplary implementation of the axle torque arbitration module 204 is presented. The axle torque arbitration module 204 includes an immediate torque determination module 402, a predicted torque limit module 404, an immediate torque limit module 406, a predicted torque arbitration module 408, and an immediate torque arbitration module 410. The immediate torque determination module 402 receives the driver immediate torque request from the driver interpretation module 202 and the DFCO torque from the torque cut-off module 218.

The immediate torque determination module 402 outputs the immediate torque that is lowest in value between the immediate torques from the driver interpretation module 202 and the torque cut-off module 218. The predicted torque limit module 404 receives the minimum torque from the RPM control module 208 and the driver predicted torque request from the driver interpretation module 202. The predicted torque limit module 404 applies the minimum torque as a lower limit to the driver predicted torque request. The predicted torque limit module 404 may also limit a received axle torque request.

The immediate torque limit module 406 receives the immediate torque from the immediate torque determination module 402 and the axle torque requests. The immediate torque limit module 406 applies limits to the immediate torque. For example only, an upper limit may be applied that protects against invalid torque requests or torque requests that would damage the engine 102. For example only, a lower limit may be applied to prevent stalling the engine 102. For example only, the limit may be based on a capacity based on fast actuators that are available to meet the immediate torque request. The immediate torque limit module 406 may also limit a received axle torque request.

The predicted torque arbitration module 408 and the immediate torque arbitration module 410 receive the predicted and the immediate torques, respectively, and other axle torque requests. These receives torques are the torques as selectively limited by the predicted and immediate torque limit modules 404 and 406. The predicted torque arbitration module 408 arbitrates between the predicted torque and the axle torque requests. Similarly, the immediate torque arbitration module 410 arbitrates between the immediate torque and the axle torque requests. The predicted torque arbitration module 408 and the immediate torque arbitration module 410 output predicted and immediate torques, respectively.

Figure 5:
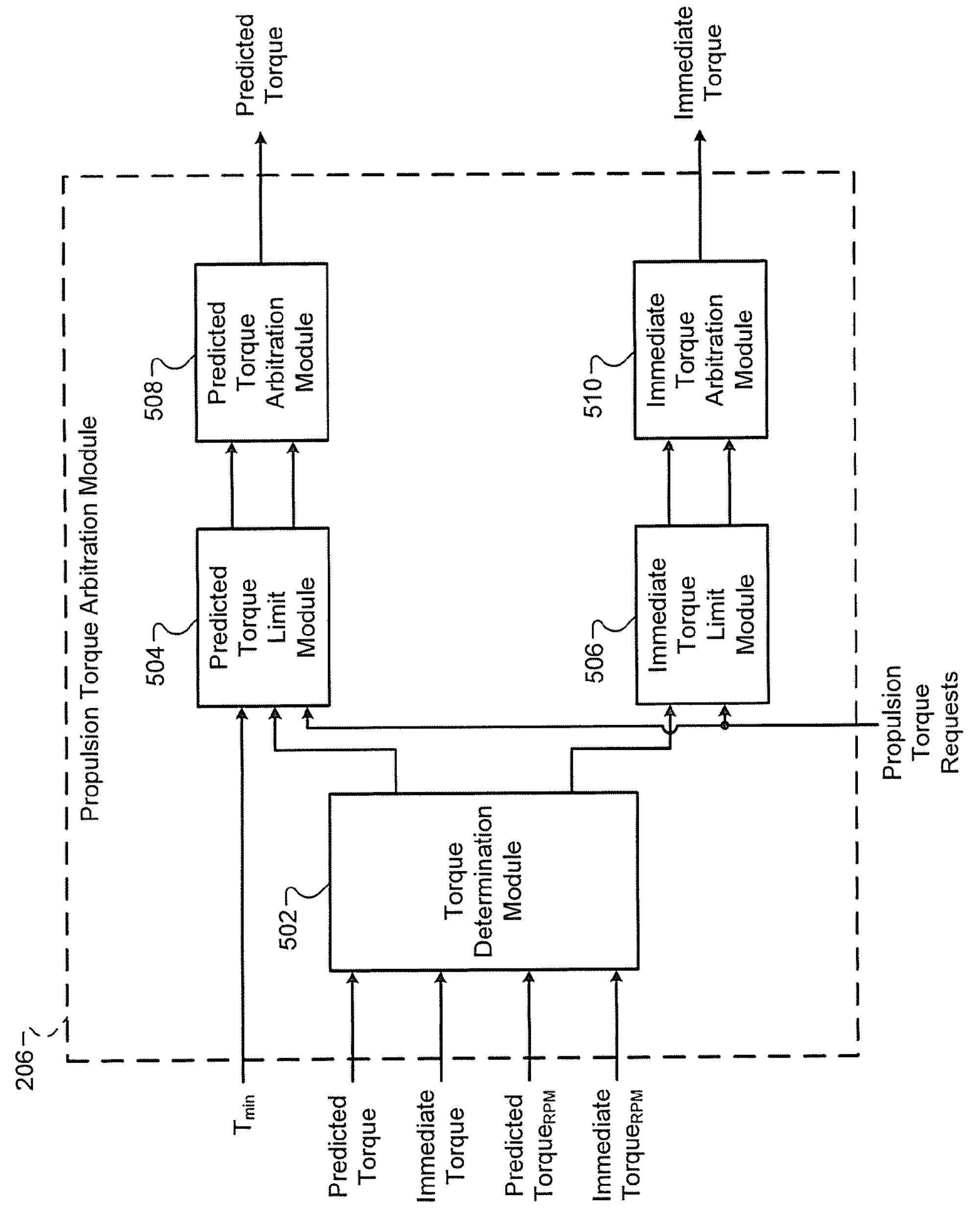
FIG. 5 is a functional block diagram of an exemplary implementation of a propulsion torque arbitration module according to the principles of the present disclosure.

Referring now to FIG. 5, a functional block diagram of an exemplary implementation of the propulsion torque arbitration module 206 is presented. The propulsion torque arbitration module 206 includes a torque determination module 502, a predicted torque limit module 504, an immediate torque limit module 506, a predicted torque arbitration module 508, and an immediate torque arbitration module 510. The torque determination module 502 receives the predicted and the immediate torques from the axle torque arbitration module 204 and RPM control predicted and immediate torques (predicted torque$_{RPM}$ and immediate torque$_{RPM}$) from the RPM control module 208.

The torque determination module 502 arbitrates between the predicted and the immediate torques from both the axle torque arbitration module 204 and the RPM control module 208. The torque determination module 502 outputs an arbitrated predicted torque to the predicted torque limit module 504 and an arbitrated immediate torque to the immediate torque limit module 506. The predicted torque limit module 504 receives the minimum torque and the arbitrated predicted torque and applies the minimum torque as a lower limit to the arbitrated predicted torque.

The immediate torque limit module 506 receives the arbitrated immediate torque from the torque determination module 502 and applies a limit to the arbitrated immediate torque. The immediate torque limit module 506 may also apply a limit to a propulsion torque request. For example only, an upper limit may be applied that protects against invalid torque requests or torque requests that would damage the engine 102. For example only, a lower limit may be applied to prevent stalling the engine 102. For example only, the limit may be based on a capacity based on fast actuators that are available to meet the immediate torque request.

The predicted torque arbitration module 508 and the immediate torque arbitration module 510 receive the predicted and the immediate torques, respectively, and the other propulsion torque requests. The predicted torque arbitration module 508 arbitrates between the predicted torque and the propulsion torque requests. Similarly, the immediate torque arbitration module 510 arbitrates between the immediate torque and the propulsion torque requests. The predicted torque arbitration module 508 and the immediate torque arbitration module 510 output predicted and immediate torques, respectively.

Figure 6:
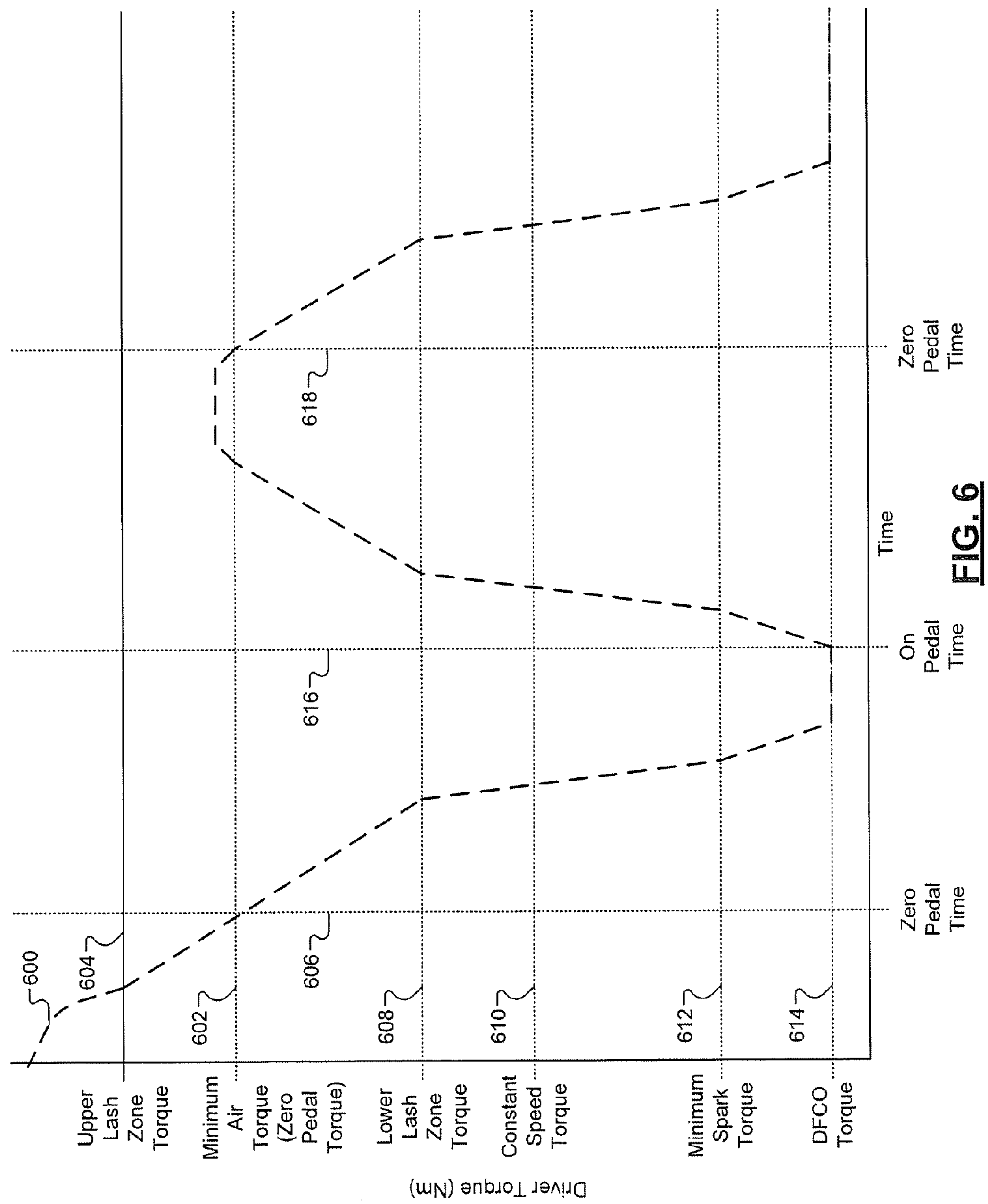
FIG. 6 is a graph depicting a driver torque versus a time of a driver interpretation module where the driver torque is used only to set a throttle area according to the principles of the present disclosure.

Referring now to FIG. 6, a graph depicting a driver torque 600 versus a time of a driver interpretation module where the driver torque 600 is used only to set the throttle area is presented. In other words, the driver torque 600 comprises only a predicted torque. Since the driver torque 600 is used only to set the throttle area, the zero pedal torque is limited to a minimum air torque 602.

When the driver pedal position starts to decrease in order to decrease a vehicle speed, the driver torque 600 starts to decrease at various rates. When the driver torque 600 is equal to an upper lash zone torque 604, the driver torque 600 starts to decrease at a first rate. At a zero pedal time 606 (i.e., a time value when the driver is off the driver pedal), the driver torque 600 is equal to the minimum air torque 602.

When the driver torque 600 is less than a lower lash zone torque 608, the driver torque 600 starts to decrease at a second rate. For example only, the second rate may be limited at a greater value than the first rate. The driver torque 600 decreases below a constant speed torque 610 (i.e., a torque value that holds the vehicle at a constant speed when the vehicle is on a downhill grade) that is less than the minimum air torque 602.

When the driver torque 600 is less than a minimum spark torque 612, the driver torque 600 starts to decrease at a third rate. For example only, the third rate may be limited at a lesser value than the second rate. When the driver torque 600 is equal to a DFCO torque 614, the driver torque 600 ceases to decrease.

At an on pedal time 616 (i.e., a time value when driver starts to be on the driver pedal), the driver torque 600 increases at the third rate. When the driver torque 600 is equal to the minimum spark torque 612, the driver torque 600 increases at the second rate and above the constant speed torque 610. When the driver torque 600 is equal to the lower lash zone torque 608, the driver torque 600 increases at the first rate.

The driver torque 600 increases until it is greater than the minimum air torque 602 (i.e., the zero pedal torque) and corresponds to the driver pedal position. When the driver pedal position starts to decrease in order to decrease the vehicle speed, the driver torque 600 starts to decrease at the first rate. At a zero pedal time 618, the driver torque 600 is equal to the minimum air torque 602.

The driver torque 600 decreases to the DFCO torque 614 at the first, the second, and the third rates, respectively. The driver via the driver inputs or the cruise control system may desire to set the driver torque 600 to the constant speed torque 610 for a period of time. Since the driver torque 600 is used only to set the throttle area and the constant speed torque 610 is less than the minimum air torque 602, the driver torque 600 may not be set to the constant speed torque 610 for the period of time. In addition, the large increases and decreases in the driver torque 600 over a short period of time, including through the lash zone, may result in a poor feel for a driver. For example only, the large magnitude of the rate of change of the driver torque 600 may cause a "clunk" or a "bump" feeling for a driver.

Figure 7:
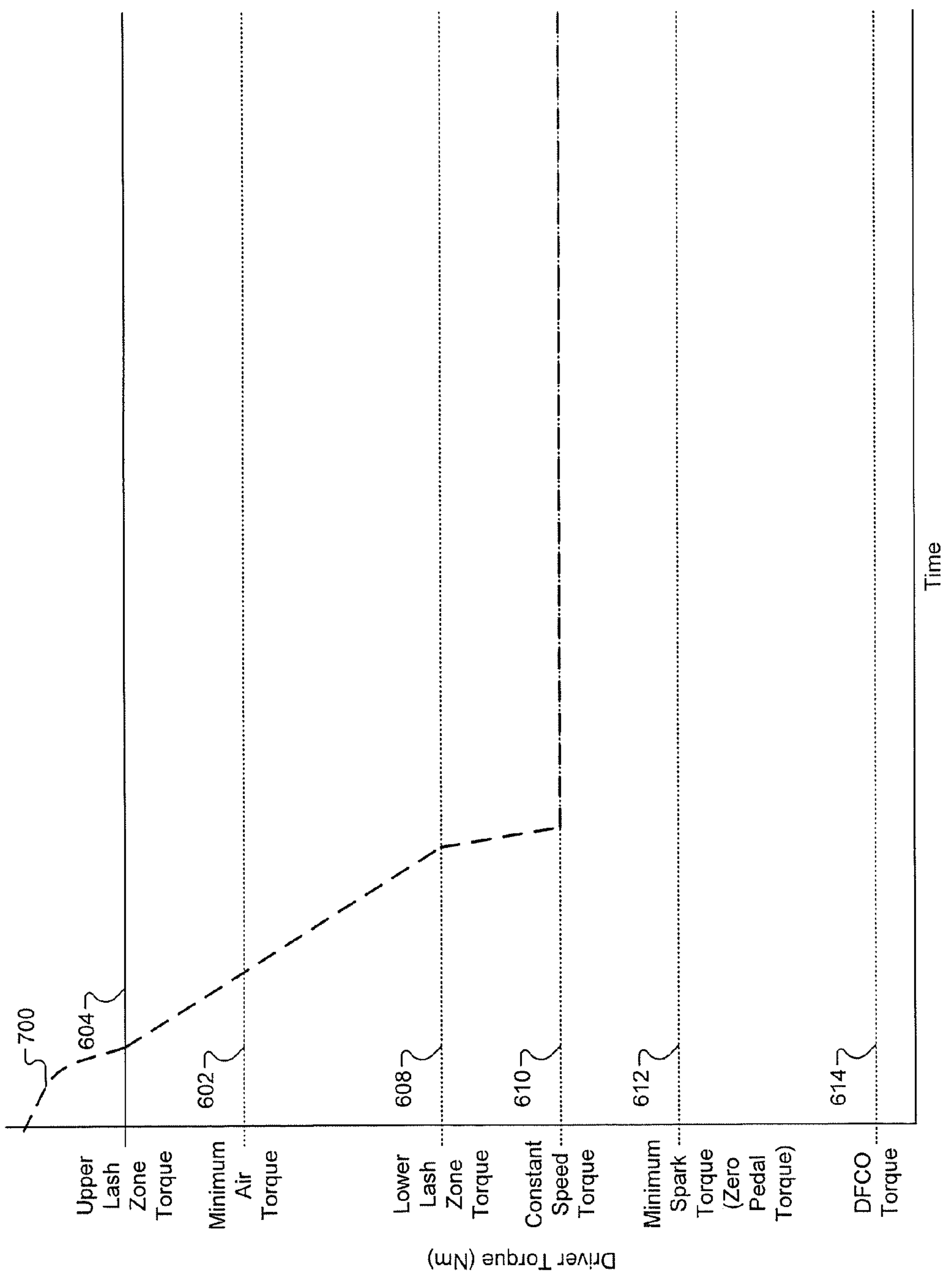
FIG. 7 is a graph depicting a driver torque versus a time of an exemplary implementation of a driver interpretation module where the driver torque is used only to set the throttle area or a spark advance according to the principles of the present disclosure.

Referring now to FIG. 7, a graph depicting a driver torque 700 versus a time of an exemplary implementation of a driver interpretation module where the driver torque 700 is used only to set the throttle area or the spark advance is shown. In other words, the driver torque 700 comprises only a predicted torque or an immediate torque that sets the spark advance. Since the driver pedal position is used only to set the throttle area or the spark advance, the zero pedal torque may be limited only to the minimum air torque 602 or the minimum spark torque 612. In this case, the zero pedal torque is limited to the minimum spark torque 612 because the constant speed torque 610 (i.e., the desired engine torque) is less than the minimum air torque 602.

When the driver pedal position starts to decrease in order to decrease the vehicle speed, the driver torque 700 starts to decrease at various rates. The driver torque 700 decreases to the constant speed torque 610 at the first and the second rates, respectively. Since the driver torque 700 is used to set the throttle area or the spark advance and the constant speed torque 610 is greater than the minimum spark torque 612, the driver torque 700 may be set to the constant speed torque 610 for the period of time that may be desired.

Figure 8:
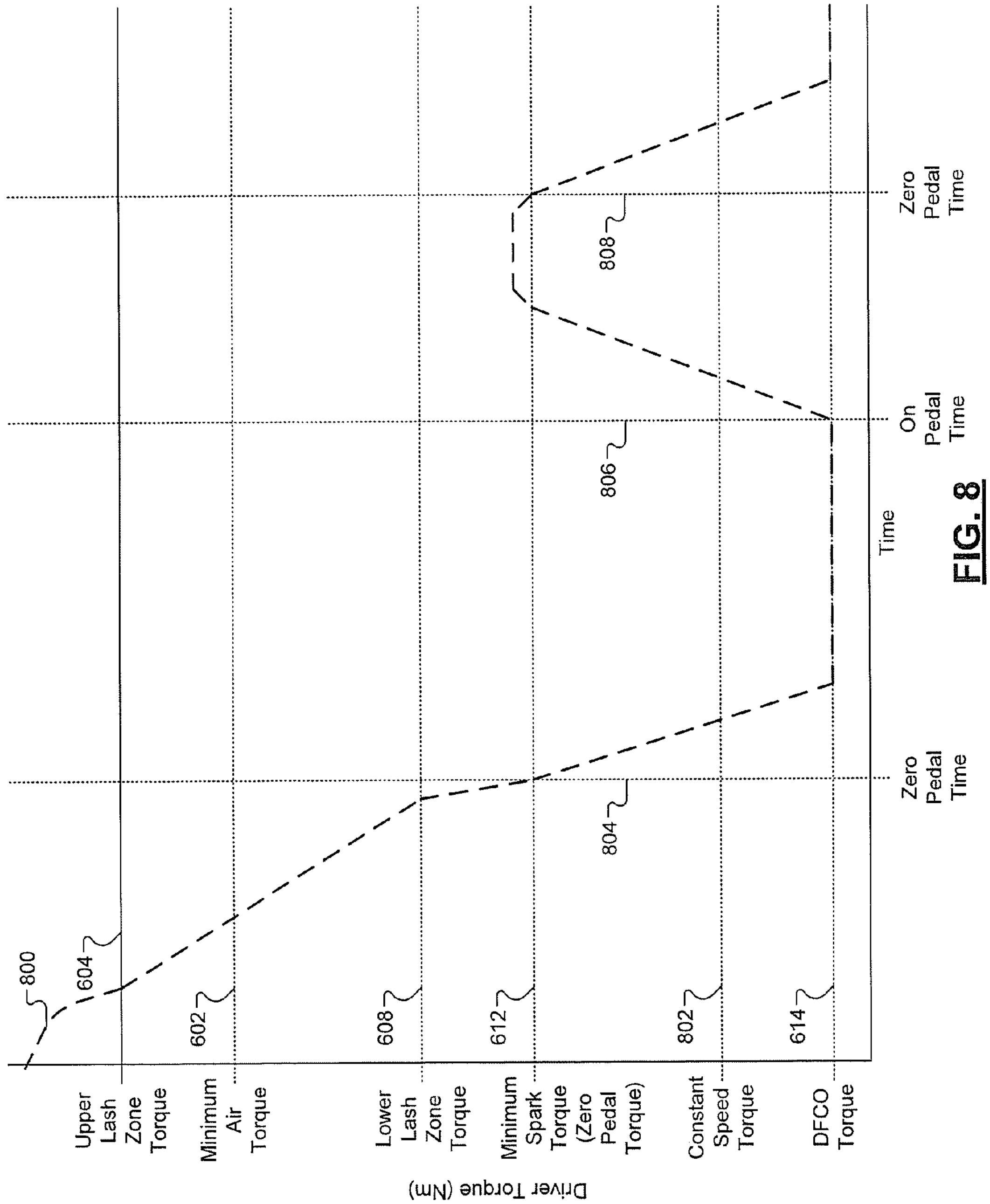
FIG. 8 is a graph depicting a driver torque versus a time of the driver interpretation module of FIG. 7 where the driver torque is used only to set the throttle area or the spark advance according to the principles of the present disclosure.

Referring now to FIG. 8, a graph depicting a driver torque 800 versus a time of the driver interpretation module of FIG. 7 where the driver torque 800 is used only to set the throttle area or the spark advance is presented. In this case, a constant speed torque 802 is less than the minimum spark torque 612. The zero pedal torque is limited to the minimum spark torque 612 because the constant speed torque 802 is less than the minimum spark torque 612.

When the driver pedal position starts to decrease in order to decrease the vehicle speed, the driver torque 800 starts to decrease at various rates. The driver torque 800 decreases to the minimum spark torque 612 at the first and the second rates, respectively. At a zero pedal time 804, the driver torque 800 is equal to the minimum spark torque 612.

When the driver torque 800 is less than the minimum spark torque 612, the driver torque 800 starts to decrease at the third rate. The driver torque 800 decreases below the constant speed torque 802. When the driver torque 800 is equal to the DFCO torque 614, the driver torque 800 ceases to decrease.

At an on pedal time 806, the driver torque 800 increases at the third rate and above the constant speed torque 802. When the driver torque 800 is equal to the minimum spark torque 612, the driver torque 800 increases at the second rate. The driver torque 800 increases until it is greater than the minimum spark torque 612 (i.e., the zero pedal torque) and corresponds to the driver pedal position.

When the driver pedal position starts to decrease in order to decrease the vehicle speed, the driver torque 800 starts to decrease at the second rate. At a zero pedal time 808, the driver torque 800 is equal to the minimum spark torque 612. The driver torque 800 decreases to the DFCO torque 614 at the third rate.

Since the driver torque 800 is used only to set the throttle area or the spark advance and the constant speed torque 802 is less than the minimum spark torque 612, the driver torque 800 may not be set to the constant speed torque 802 for the period of time that may be desired. The rate of change of the driver torque 800 is smaller than the rate of change of the driver torque 600. Thus, the driver torque 800 causes little or no clunk. The driver torque 800 displays more range of control than the driver torque 600 and, therefore, experiences drivability cycling less often.

Figure 9:
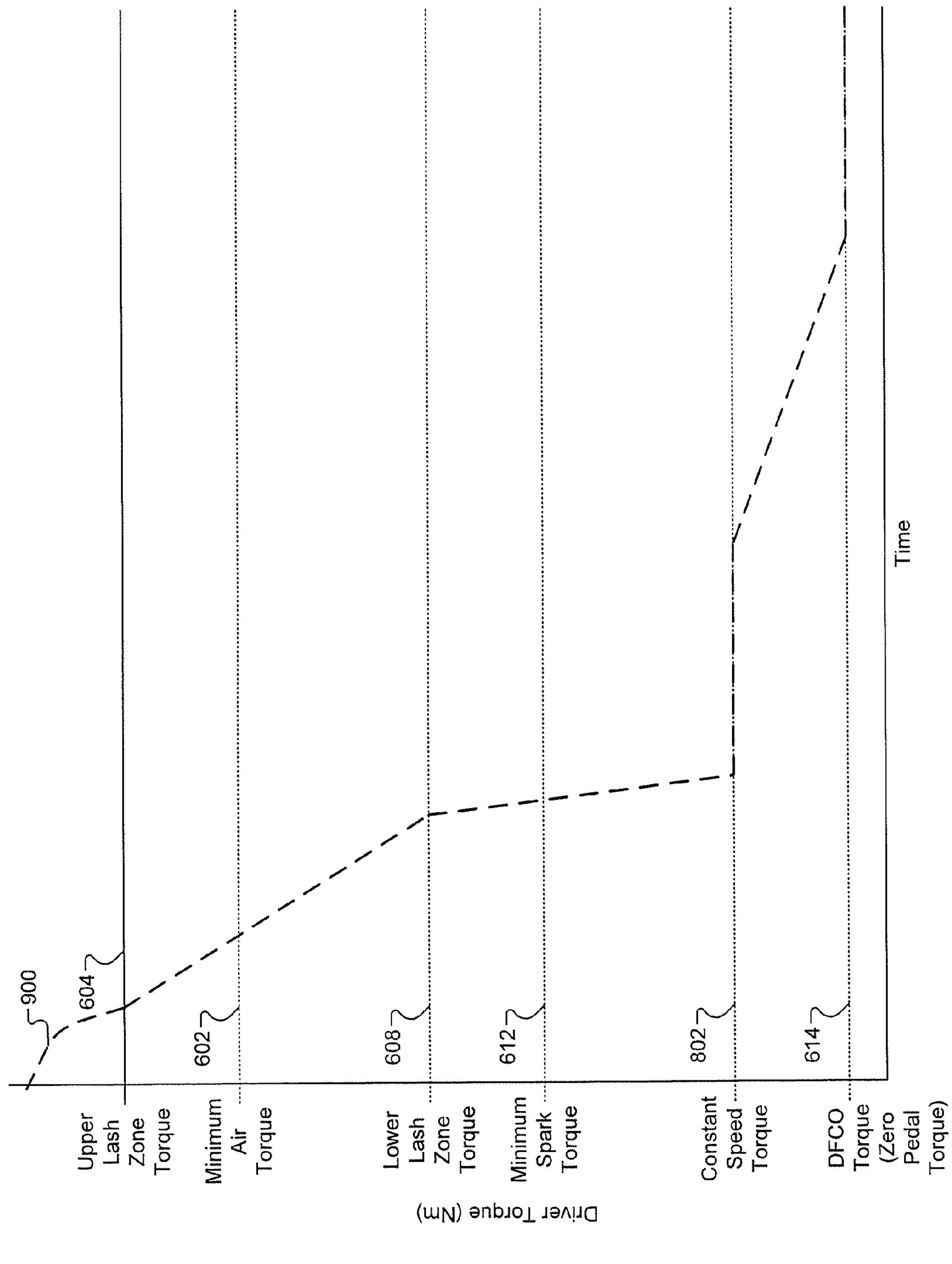
FIG. 9 is a graph depicting a driver torque versus a time of the driver interpretation module of FIG. 3 where the driver torque is used to set the throttle area, the spark advance, or a fuel command according to the principles of the present disclosure.

Referring now to FIG. 9, a graph depicting a driver torque 900 versus a time of the driver interpretation module 202 where the driver torque 900 is used to set the throttle area, the spark advance, or the fuel command is shown. In other words, the driver torque 900 comprises a predicted torque or an immediate torque that sets either the spark advance or the fuel command. When the driver torque 900 is used to set the throttle area, the spark advance, or the fuel command, the zero pedal torque may be limited to the DFCO torque 614.

When the driver pedal position starts to decrease in order to decrease the vehicle speed, the driver torque 900 starts to decrease at various rates. The driver torque 900 decreases to the constant speed torque 802 at the first and the second rates. respectively. For example only, when the driver torque 900 is used to set the throttle area, the spark advance, or the fuel command, the third rate may be limited at the value equal to the second rate.

Since the driver torque 900 is used to set the throttle area, the spark advance, or the fuel command, the driver torque 900 may be set to the constant speed torque 802 for a period of time before decreasing to the DFCO torque 614. Torque levels between the minimum spark torque 612 and the DFCO torque 614, however, cannot be maintained for long periods of time due to emissions concerns and engine impacts that may result from fueling of less than all of the cylinders. The driver torque 900 displays less drivability cycling as the driver torque 800, but may be unable to sustain all constant speed torques for extended periods of time.

Figure 10A:
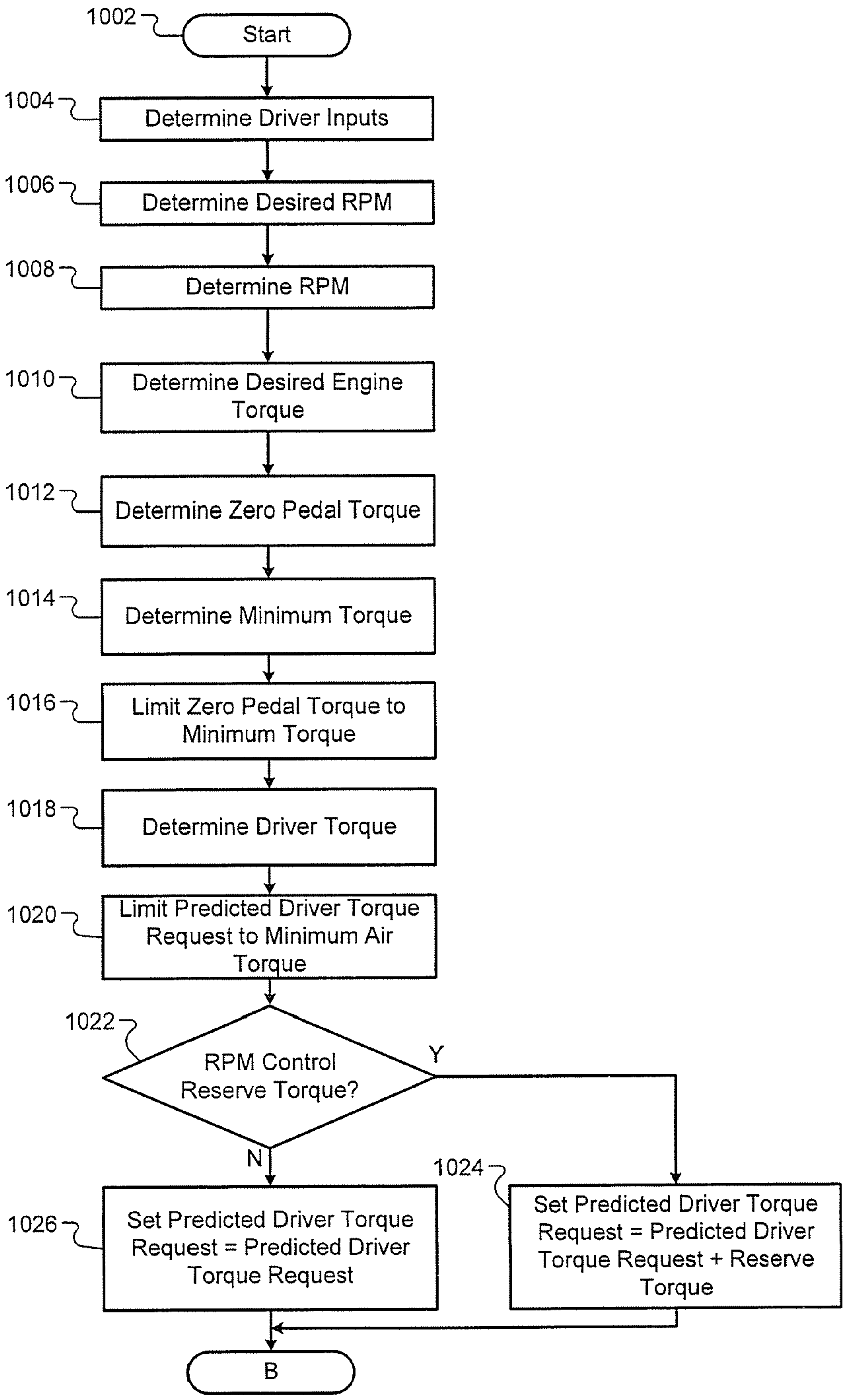
FIG. 10A is a flowchart of exemplary steps performed by the engine control module according to the principles of the present disclosure.
Figure 10B:
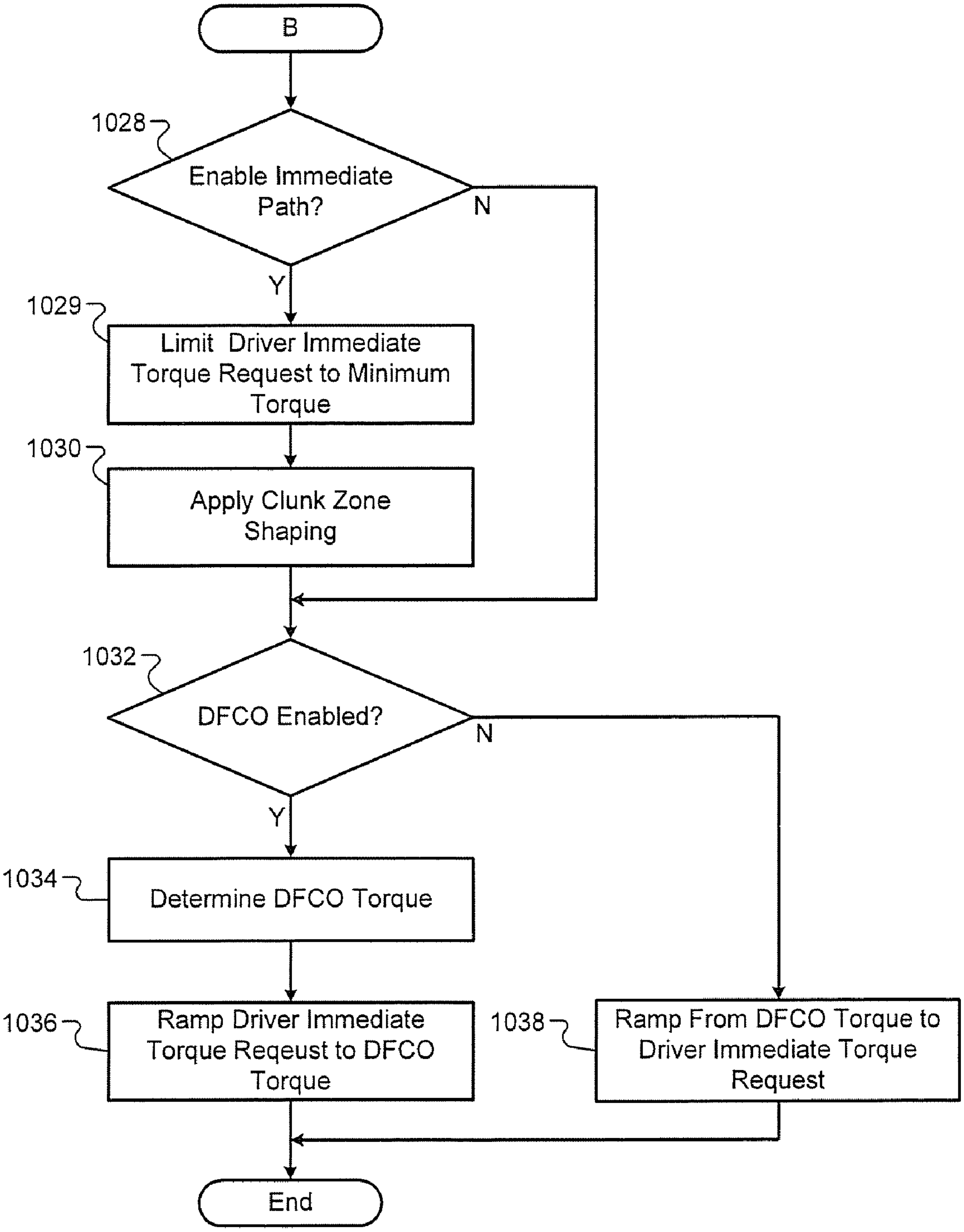
FIG. 10B is a portion of the flowchart of FIG. 10A.

Referring now to FIG. 10A and FIG. 10B, a flowchart depicting exemplary steps performed by the ECM 114 is presented. Control begins in step 1002. In step 1004, the driver inputs are determined. In step 1006, the desired RPM is determined. In step 1008, the RPM is determined. In step 1010, the desired engine torque is determined based on the desired RPM and the RPM.

In step 1012, the zero pedal torque is determined based on the desired engine torque. In step 1014, control determines a minimum torque. The minimum torque corresponds to the engine torque output at a minimum air per cylinder and a minimum spark timing allowable for proper combustion while the air conditioning compressor is off. Control limits the zero pedal torque to the minimum torque in step 1016.

In step 1018, control determines the driver torque. The driver torque is determined based on the driver pedal torque, which is determined based on the driver inputs, the zero pedal torque, the torque correction factor, and the RPM. Control limits the predicted driver torque request to a minimum air torque in step 1020. For example only, control may ramp the predicted driver torque request to the minimum air torque in step 1020. The minimum air torque corresponds to the torque value at the minimum air per cylinder and the optimum spark advance that can maintain proper air/fuel combustion.

Control determines whether a reserve torque for RPM control has been requested in step 1022. If true, sets the driver predicted torque request equal to a sum of the driver predicted torque request and the reserve torque requested in step 1024. If false, control sets the driver predicted torque request equal to the driver predicted torque request in step 1026. Control proceeds to step 1028 after either of steps 1024 and 1026 is performed.

Control determines whether the immediate path is enabled in step 1028. If true, control continues to step 1029; if false, control transfers to step 1032. Step 1032 is discussed further below. Control may enable the immediate path when the driver torque is less than the minimum air torque or when the RPM control reserve torque is greater than zero. Control limits the driver immediate torque request to the minimum torque in step 1029.

In step 1030, control applies clunk zone shaping to the driver immediate torque request. Shaping the driver immediate torque request through the clunk zone provides a better driving feel without clunks that may otherwise be felt if the axle torque transitions from positive to negative or vice versa. Control determines whether DFCO is enabled in step 1032. If true, control proceeds to step 1034; if false, control transfers to step 1038. DFCO may be enabled when the driver immediate torque request is equal to the zero pedal torque. Step 1038 is discussed below.

Control determines a DFCO torque in step 1034. The DFCO torque corresponds to the torque value to disable the cylinders. Control ramps the driver immediate torque request to the DFCO torque in step 1036. In this manner, control prevents clunk that may otherwise occur if the driver immediate torque request was stepped down to the DFCO torque. Referring again to step 1038 (i.e., when the DFCO mode is not enabled), control ramps the driver immediate torque request up from the DFCO torque to the driver immediate torque request. Control then ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:

a pedal torque determination module that determines a zero pedal torque based on a desired engine torque at a zero accelerator pedal position and a minimum torque limit for an engine system;

a driver interpretation module that determines a driver pedal torque based on the zero pedal torque and an accelerator pedal position; and an actuation module that controls at least one of a throttle area, spark timing, and a fuel command based on the driver pedal torque.

2. The engine control system of claim 1 wherein:

a throttle valve is controlled based on the throttle area;

a spark plug is controlled based on the spark timing; and a fuel injection system is controlled based on the fuel command.

3. The engine control system of claim 1 wherein the minimum torque limit is based on a minimum air per cylinder and minimum spark timing for combustion while an air conditioning compressor is off.

4. The engine control system of claim 1 wherein the pedal torque determination module limits the zero pedal torque to the minimum torque limit.

5. The engine control system of claim 1 wherein the driver interpretation module determines a driver predicted torque request and a driver immediate torque request based on the driver pedal torque, and wherein the actuation module adjusts the throttle area based on the driver predicted torque request and adjusts the spark timing and the fuel command based on the driver immediate torque request.

6. The engine control system of claim 5 wherein the driver interpretation module limits the driver predicted torque request to a minimum air torque determined for the engine system based on an optimal spark timing.

7. The engine control system of claim 6 wherein the driver interpretation module limits the driver immediate torque request to the zero pedal torque when the driver pedal torque is less than the minimum air torque.

8. The engine control system of claim 7 wherein the driver interpretation module limits the driver immediate torque request to the zero pedal torque.

9. The engine control system of claim 5 wherein the driver interpretation module increases the driver predicted torque request based on a reserve torque request generated by an engine speed control module.

10. The engine control system of claim 5 further comprising a torque cut-off module that decreases the driver immediate torque request at a predetermined rate to a fuel cut-off torque when the driver immediate torque request is equal to the zero pedal torque, wherein the fuel cut-off torque is less than the minimum torque limit and the zero pedal torque.

11. An engine control method comprising:

determining a zero pedal torque based on a desired engine torque at a zero accelerator pedal position and a minimum torque limit for an engine system;

determining a driver pedal torque based on the zero pedal torque and an accelerator pedal position; and controlling at least one of a throttle area, spark timing, and a fuel command based on the driver pedal torque.

12. The engine control method of claim 11 further comprising:

controlling a throttle valve based on the throttle area;

controlling a spark plug based on the spark timing; and controlling a fuel injection system based on the fuel command.

13. The engine control method of claim 11 further comprising determining the minimum torque limit based on a minimum air per cylinder and minimum spark timing for combustion while an air conditioning compressor is off.

14. The engine control method of claim 11 further comprising limiting the zero pedal torque to the minimum torque limit.

15. The engine control method of claim 11 further comprising:

determining a driver predicted torque request and a driver immediate torque request based on the driver pedal torque;

adjusting the throttle area based on the driver predicted torque request; and adjusting the spark timing and the fuel command based on the driver immediate torque request.

16. The engine control method of claim 15 further comprising limiting the driver predicted torque request to a minimum air torque determined for the engine system based on an optimal spark timing.

17. The engine control method of claim 16 further comprising limiting the driver immediate torque request to the zero pedal torque when the driver pedal torque is less than the minimum air torque.

18. The engine control method of claim 17 further comprising limiting the driver immediate torque request to the zero pedal torque.

19. The engine control method of claim 15 further comprising increasing the driver predicted torque request based on a reserve torque request generated by an engine speed control module.

20. The engine control method of claim 15 further comprising decreasing the driver immediate torque request at a predetermined rate to a fuel cut-off torque when the driver immediate torque request is equal to the zero pedal torque, wherein the fuel cut-off torque is less than the minimum torque limit and the zero pedal torque.

* * * * *